US010943445B2

(12) United States Patent
Birnbaum et al.

(10) Patent No.: US 10,943,445 B2
(45) Date of Patent: Mar. 9, 2021

(54) SYSTEMS AND METHODS FOR PROVIDING HAPTIC EFFECTS WITH AIRFLOW AND THERMAL STIMULATION (71) Applicant: Immersion Corporation, San Jose, CA (US)

(72) Inventors: David M. Birnbaum, Van Nuys, CA (US); Sanya Attari, Fremont, CA (US); Hossam Bahlool, Palo Alto, CA (US); Doug Billington, Campbell, CA (US); Bruno Garrido, San Jose, CA (US)

(73) Assignee: Immersion Corporation, San Francisco, CA (US)

( * ) Notice: Subject to any disclaimer, the term of this patent is extended or adjusted under 35 U.S.C. 154(b) by 38 days.

(21) Appl. No.: 16/410,676

(22) Filed: May 13, 2019

(65) Prior Publication Data
US 2020/0364994 A1 Nov. 19, 2020

(51) Int. Cl.
G08B 17/00 (2006.01)
G08B 6/00 (2006.01)
G08B 21/18 (2006.01)

(52) U.S. Cl.
CPC ............ G08B 6/00 (2013.01); G08B 21/18 (2013.01)

(58) Field of Classification Search
CPC ........... G08B 6/00; G08B 21/18; G06F 3/016; G06F 3/012; G06F 3/011; A63F 13/28;
(Continued)

(56) References Cited

U.S. PATENT DOCUMENTS

2013/0069804 A1* 3/2013 Han .................. G06F 3/016
341/20
2016/0018273 A1* 1/2016 Jordan ................. G01K 7/015
702/130

(Continued)

FOREIGN PATENT DOCUMENTS

EP 2511793 A2 10/2012
EP 2846227 A2 3/2015
WO 20090007952 A2 1/2009

OTHER PUBLICATIONS

Conditt, "Vortex review: The most fun you can have with a desktop heater", www.engadget.com/2018/10/08/vortx-review-pc-gaming-wind-4d-immersion/, retrieved on May 13, 2019, Article date Oct. 8, 2018.

(Continued)

Primary Examiner — Anh V La
(74) Attorney, Agent, or Firm — Kilpatrick Townsend & Stockton LLP (57) ABSTRACT Systems and methods for providing haptic effects with airflow and thermal stimulation are disclosed. One illustrative system described herein includes a haptic output device comprising a thermal actuator and a processor communicatively coupled to the haptic output device and configured to: receive a sensor signal from at least one sensor, determine a heat flux property based in part on the display signal or a predefined parameter, determine a haptic effect based in part on the heat flux property and the sensor signal, the heat flux property being representative of a rate of change of temperature, and transmit a haptic signal associated with the haptic effect to the haptic output device.

20 Claims, 7 Drawing Sheets (58) Field of Classification Search
CPC .. G02B 27/017; G02B 27/022; G02B 27/028; H05B 3/00
USPC ............ 340/584, 407.1, 407.2; 345/156, 173
See application file for complete search history.

(56) References Cited

U.S. PATENT DOCUMENTS

| | | | |
|---|---|---|---|
| 2016/0091877 A1* | 3/2016 | Fullam | G06T 19/006 700/276 |
| 2016/0238040 A1* | 8/2016 | Gallo | A61H 9/0078 |
| 2016/0351774 A1* | 12/2016 | Schneider | A63B 21/00 |
| 2017/0177085 A1 | 6/2017 | Sun et al. | |
| 2017/0243453 A1* | 8/2017 | Birnbaum | A63F 13/25 |
| 2018/0095534 A1* | 4/2018 | Omote | A63F 13/28 |
| 2019/0079480 A1 | 3/2019 | Sun | |

OTHER PUBLICATIONS

Guiatni et al., "Thermal Display for Telepresence based on Neural Identification and Heat Flux Control", Presence: vol. 18, No. 2, Apr. 2009, 156-169.
Lee , "Wind Tactor: An Airflow-based Wearable Tactile Display", Doctoral Consortium, UIST'17 Adjunct, Oct. 22-25, 2017, Quebec City, Canada, copyright 2017 Association for Computing Machinery, pp. 91-94.
U.S. Appl. No. 15/848,855, filed Dec. 20, 2017.
International Search Report/Written Opinion dated Jul. 14, 2020 in International Patent Application No. PCT/US2020/032310.

* cited by examiner

SYSTEMS AND METHODS FOR PROVIDING HAPTIC EFFECTS WITH AIRFLOW AND THERMAL STIMULATION

FIELD OF THE INVENTION

The present application relates to the field of user interface devices. More specifically, the present application relates to providing haptic effects with airflow and thermal stimulation.

BACKGROUND

Virtual and Augmented Reality ("VR" and "AR") applications have become increasingly popular. A goal of many VR and AR applications is to create an immersive, simulated environment. However, a user's sense of place and environment is dramatically affected by sensations of temperature, airflow, and other properties. Current VR and AR applications lack the capability of accurately and efficiently simulating these sensations. Room-scale VR feedback devices or body-mounted devices used in location based entertainment (LBE) facilities are large, expensive, and can be difficult for users to get on and off, which makes them difficult for LBEs to integrate. Accordingly, a need exists for accurately and efficiently simulating sensations of temperature, airflow, and other properties in VR and AR applications to increase the impressiveness of the applications and provide an improved user experience.

SUMMARY

Embodiments of the present disclosure comprise systems and methods for providing haptic effects with airflow and thermal stimulation. In one embodiment, a system comprises a haptic output device that comprises a thermal actuator. The system also comprises a processor communicatively coupled to the haptic output device and configured to: receive a sensor signal from the at least one sensor, determine a heat flux property based in part on the display signal and a predefined parameter, determine a haptic effect based in part on the heat flux property and the sensor signal, the heat flux property being representative of a rate of change of temperature, and transmit a haptic signal associated with the haptic effect to the haptic output device.

In another embodiment, a method for providing haptic effects with airflow and thermal stimulation comprises receiving a sensor signal from at least one sensor, determining a heat flux property based in part on a display signal and a predefined parameter, determining a haptic effect based in part on the heat flux property and the sensor signal, the heat flux property being representative of a rate of change of temperature, and transmitting a haptic signal associated with the haptic effect to a haptic output device that comprises a thermal actuator and an airflow actuator.

In yet another embodiment, a non-transitory computer readable medium may comprise program code, which when executed by a processor is configured to perform such methods.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Providing Haptic Effects with Airflow and Thermal Stimulation Embodiments provide for haptic feedback that includes airflow and thermal stimulation. Such embodiments may allow a user to feel and experience temperature and airflow changes based on what is being shown on a display or based on user input, thus creating a more immersive experience for the user. These embodiments may be useful in a VR or AR environment by incorporating the airflow and thermal stimulation into a wearable peripheral device, such as a head-mounted display ("HMD"), e.g., a virtual reality head-mounted display or an augmented reality head-mounted display. As different materials, events, or environments are shown on the display, the system may provide airflow and/or thermal stimulation based on the heat flux properties of what is shown on the display.

In one illustrative embodiment, an airflow actuator, e.g., a fan, and/or a thermal actuator, e.g., a Peltier device, may be used to change the temperature and/or the airflow that the user experiences. The airflow actuator and the thermal actuator may be controlled based on a video input from the display or based on user input to cause a change in the airflow and/or temperature the user experiences. A sensor may be located proximate to the airflow actuator, the thermal actuator, and/or a portion of the skin of a user to provide data to control the airflow actuator and the thermal actuator.

In one illustrative embodiment, the haptic feedback device comprises a wearable VR HMD with an integrated system for providing haptic effects that include airflow and thermal stimulation. The VR HMD displays a video that shows different environments around the world. The airflow and thermal stimulation haptic effects output by the integrated system cause the user to feel as though they are in the environment displayed on the VR HMD. For example, when the video shows a snowy or mountainous environment, a fan on the VR HMD coupled to a cooling device may blow cold air toward the user's face, thus the user feels cold air blowing against their face. In another embodiment, when the video shows a desert environment, a heating device on the VR HMD may activate to output a warm temperature, and thus the user feels a heat wave sensation coming off the heating device. In yet another embodiment, when the video shows a shady canopy of trees next to a calm stream, a fan may blow air such that the user feels a light, refreshing breeze. In yet another embodiment, when the video shows an elephant face-to-face with the user the VR HMD may output a warm puff of air when the elephant snorts, thus enhancing the realism of the experience.

In another illustrative embodiment, a user is playing a game while wearing a VR or AR HMD with an integrated system for providing haptic effects that include airflow and thermal stimulation. In such an embodiment, the airflow and thermal stimulation may be used to mimic or reflect events occurring in the game. For example, in the game the user (or an avatar associated with the user) may be walking inside a haunted house when a fan on the HMD coupled to a cooling device directs a cool flow of air at the user just before the user encounters a ghost that has appeared in the game. In another embodiment, the user (or an avatar associated with the user) may be preparing to enter a burning building so a fan coupled to a heating device may blow hot air at the user, and the heating device may increase the temperature of the blowing air as the user gets closer to the flames. In yet another embodiment, the user (or an avatar associated with the user) may be in a battle, and the fan coupled with the heating device may output pulses of heated air directed at the user with each explosion that goes off near the user in the game.

In another illustrative embodiment, a user is wearing a VR or AR HMD as well as other wearables, such as gloves, that include an integrated system for providing haptic effects that include airflow and thermal stimulation. Again, the user may be playing a game and the airflow and thermal stimulation may be used to mimic or reflect events occurring in the game. For example, the user (or an avatar associated with the user) may reach out and pick up a glass object causing a heating/cooling device to output a thermal stimulation to the gloves so that it feels as though the user is touching a glass surface. In other embodiments, the user (or an avatar associated with the user) may be walking across a bridge holding a wooden handrail in one hand and a metal handrail in the other, and the heating/cooling devices in each of the gloves the user is wearing will output a thermal stimulation to the gloves that mimics the feeling of wooden and metal surfaces. The system will adjust the thermal stimulation output by the heating/cooling devices based on the heat flux properties of each material so that the rate of change of temperature that the user perceives renders an accurate illusion of the heat flux properties of the actual materials.

This illustrative example is given to introduce the reader to the general subject matter discussed herein and the disclosure is not limited to this example. The following sections describe various additional non-limiting examples of the present disclosure.

Figure 1A:
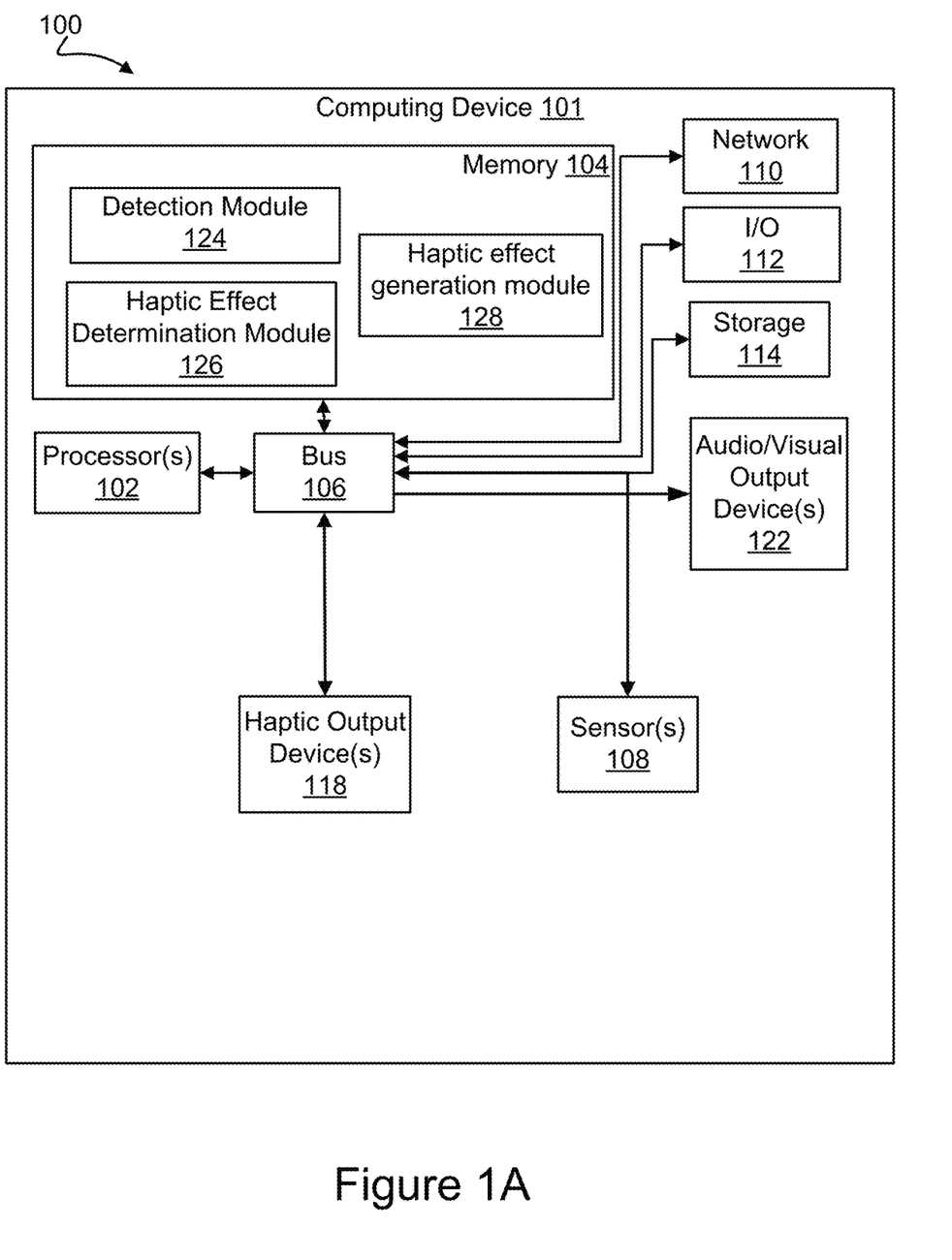
FIG. 1A shows an illustrative system for providing haptic effects with airflow and thermal stimulation.

Illustrative Systems for Providing Haptic Effects with Airflow and Thermal Stimulation FIG. 1A shows an illustrative system 100 for providing haptic effects with airflow and thermal stimulation. Particularly, in this example, system 100 comprises a computing device 101 having a processor 102 interfaced with other hardware via bus 106 and a memory 104. Computing device 101 may comprise, for example, a server (remote, cloud-based and/or local), a laptop, tablet, mobile phone, gaming console, wearable game interface (e.g., an augmented reality or virtual reality headset), or other type of computer or computing device.

Memory 104, which can comprise any suitable tangible (and non-transitory) computer-readable medium such as RAM, ROM, EEPROM, or the like, embodies program components that configure operation of the computing device 101. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, for example, VR and AR HMDs, touch screen displays, or curved displays (e.g., the display includes angled surfaces extended onto one or more sides of computing device 101 on which images may be displayed), keyboards, mice, speakers, microphones, cameras (e.g., a front and/or a rear facing camera on a mobile device), and/or other hardware used to input data or output data. In some embodiments, I/O components 112 may comprise VR controllers, AR input devices, VR/AR wearables, or any other electronic peripheral. The I/O components 112 may function as an input capture device that receives an input and transmits an input signal to processor 102. In some embodiments, the input capture device may include a keyboard, mouse, touchscreen VR controller, AR input device, VR/AR wearable, a gaming controller, a speaker, a microphone. In other embodiments, I/O components 112 may comprise a controller or input capture device in a transportation device, such as a car, or boat. In yet other embodiments, the controllers or input capture devices may be the user's hands, and sensors 108 may be able to detect the movements and gestures in free space. Storage 114 represents nonvolatile storage such as magnetic, optical, or other storage media included in device 101.

Audio/visual output device(s) 122 comprise one or more devices configured to receive signals from processor(s) 102 and provide audio or visual output to the user. For example, in some embodiments, audio/visual output device(s) 122 may comprise a display such as a touch-screen display, LCD display, plasma display, CRT display, projection display, or some other display known in the art. For use in augmented or virtual reality, audio/visual output device 122 may comprise a HMD that is a headset comprising a display for each eye, a mobile device, e.g., a mobile phone or tablet, a windshield of a vehicle, or some other display known in the art. Further, audio/visual output devices may comprise one or more speakers configured to output audio to a user.

System 100 further includes one or more sensors 108, e.g., one or more of a thermocouple, a temperature sensor, a heat flux sensor, or an airflow sensor. The sensors 108 may be configured to detect environmental characteristics based on airflow and thermal stimulation and provide appropriate data for use by processor 102. For example, such sensors may detect the temperature or airflow of the area of the user where the airflow and thermal stimulation is directed. As another example, such sensors may detect the heat flux of the area of the user where the airflow and thermal stimulation is directed. In some examples, the sensors 108 may be in communication with a shut-off switch that enables the system to shut down if the sensors 108 detect thermal or airflow intensities that are outside of a predetermined range. This may allow the system to shut down before causing an uncomfortable sensation for the user.

Any suitable number, type, or arrangement of sensors can be used. For example, different embodiments may include cameras, lasers, radars, thermometers, thermocouples, airflow sensors, heat flux sensors, accelerometers, gyrometers, pressure sensors, magnetic sensors, light sensors, microphones, capacitive sensors, touch sensors, tracking sensors, or any combination of such sensors. In one embodiment, a camera, laser mapping, or radar scanning is used to identify the haptic output device 118. Such an embodiment may utilize artificial intelligence ("AI") to make the identification. A thermometer or thermocouple may be used to detect temperature. An airflow sensor may be used to detect airflow, or an air pressure sensor may be used to estimate airflow. A heat flux sensor may be used to detect heat flux, or a thermometer may be used to estimate heat flux. An accelerometer may be used to detect vibration, displacement, and speed. A gyrometer may be used to sense rotation. A pressure sensor may be used to determine altitude and a magnetic sensor to determine direction or orientation. A light sensor may be used to determine perceived luminosity. And a microphone may be used to detect sound. Any of these sensors may be used in combination with any other sensor. In other embodiments, the sensor 108 may comprise an LED detector. In some embodiments, the processor 102 is in communication with a single sensor 108, in other embodiments, the processor 102 is in communication with a plurality of sensors 108.

Figure 1B:
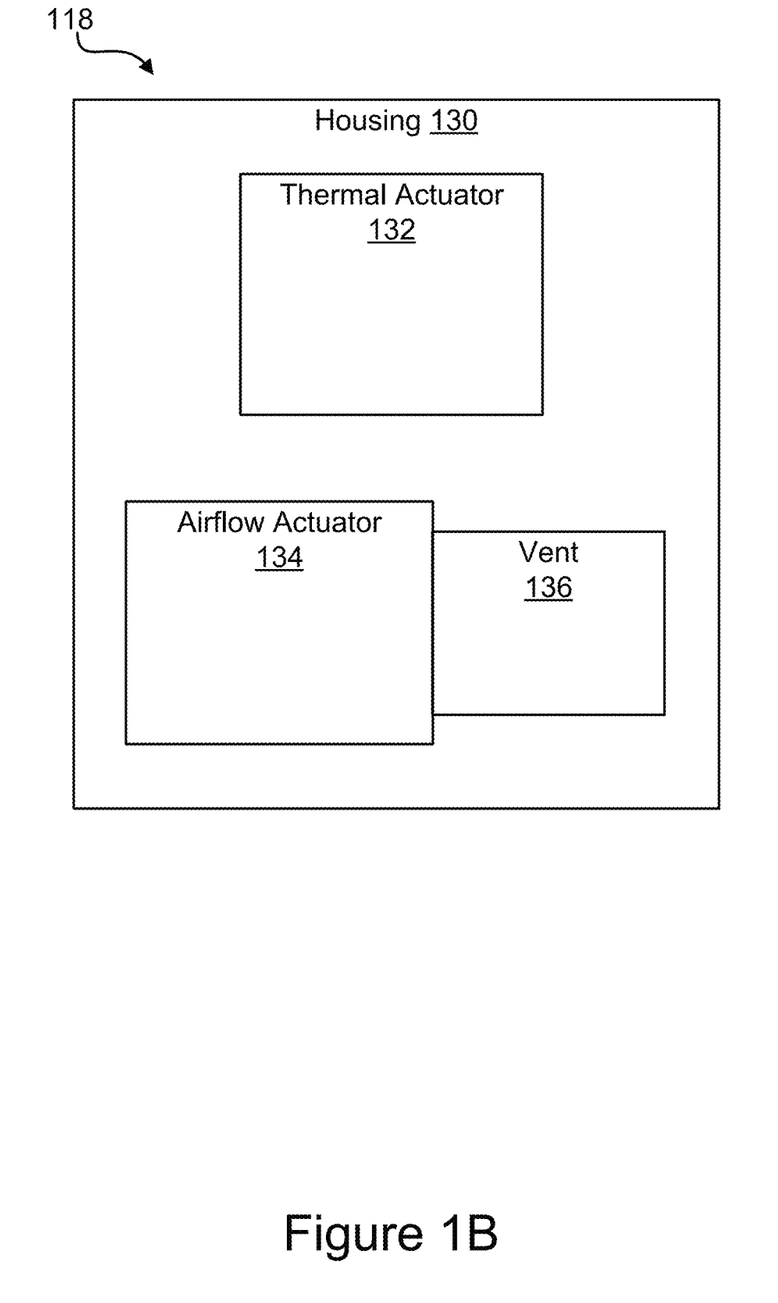
FIG. 1B shows an illustrative haptic output device for providing haptic effects with airflow and thermal stimulation.

Processor 102 is further coupled to a haptic output device 118 to output haptic effects. Although a single haptic output device 118 is shown here, embodiments may use multiple haptic output devices 118 of the same or different type to output haptic effects. In one embodiment, haptic output device 118 may be used to output airflow and/or thermal properties to the user. An example embodiment of such a haptic output device 118 is shown in FIG. 1B. FIG. 1B shows an example haptic output device 118 with a thermal actuator 132, an air flow actuator 134, and a vent 136 in a housing 130. In some embodiments, airflow actuators 134, e.g., fans, blowers, impellers, eco-coolers, pumps, air multipliers, etc., may be used to control the airflow output by the haptic output device 118 and one or more vents 136 may direct airflow toward the user. In some embodiments, vents 136 may comprise one or more of vents, valves, reeds, or other devices configured to direct airflow.

Figure 1C:
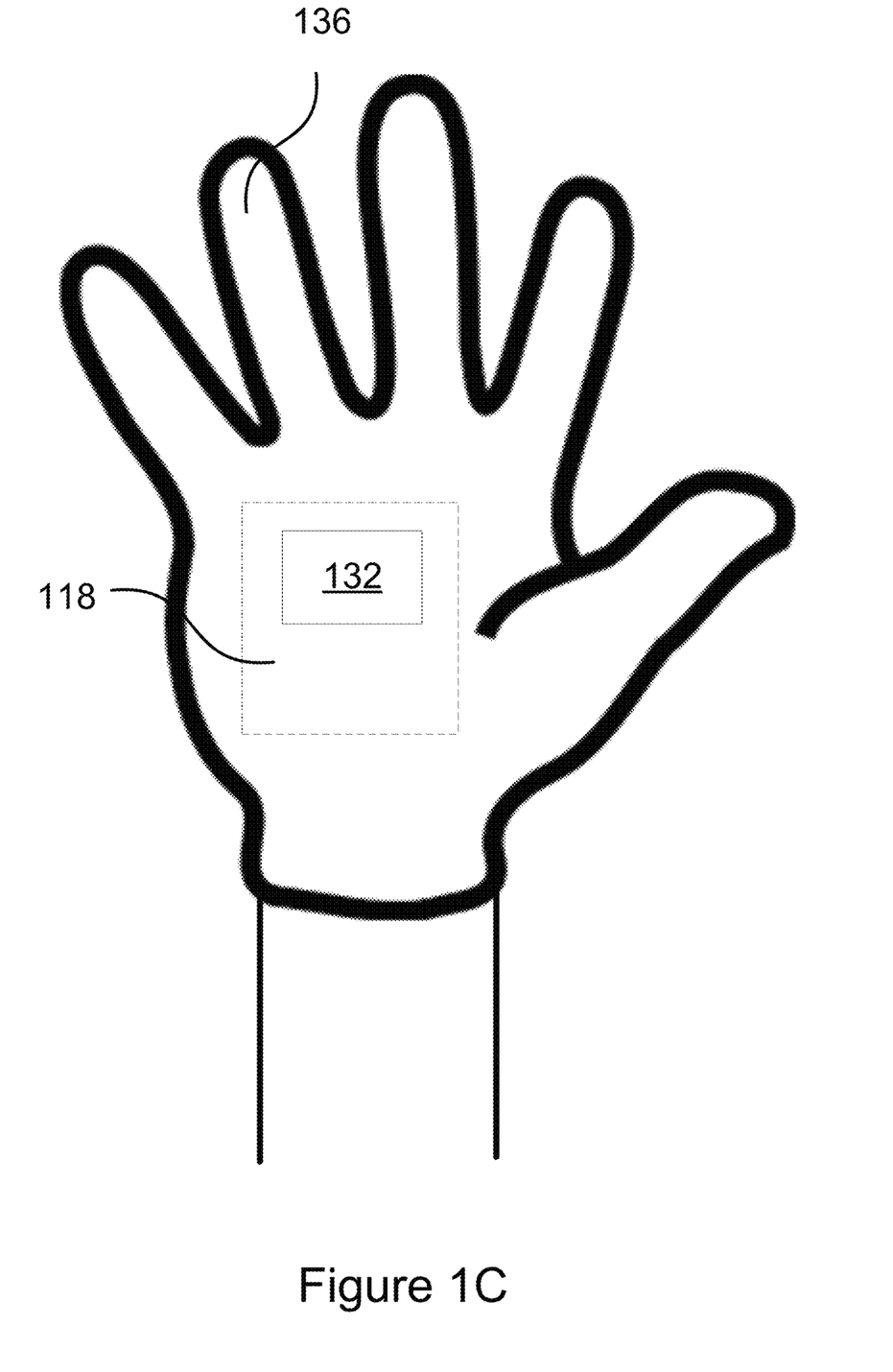
FIG. 1C shows another illustrative system for providing haptic effects with airflow and thermal stimulation.
Figure 1D:
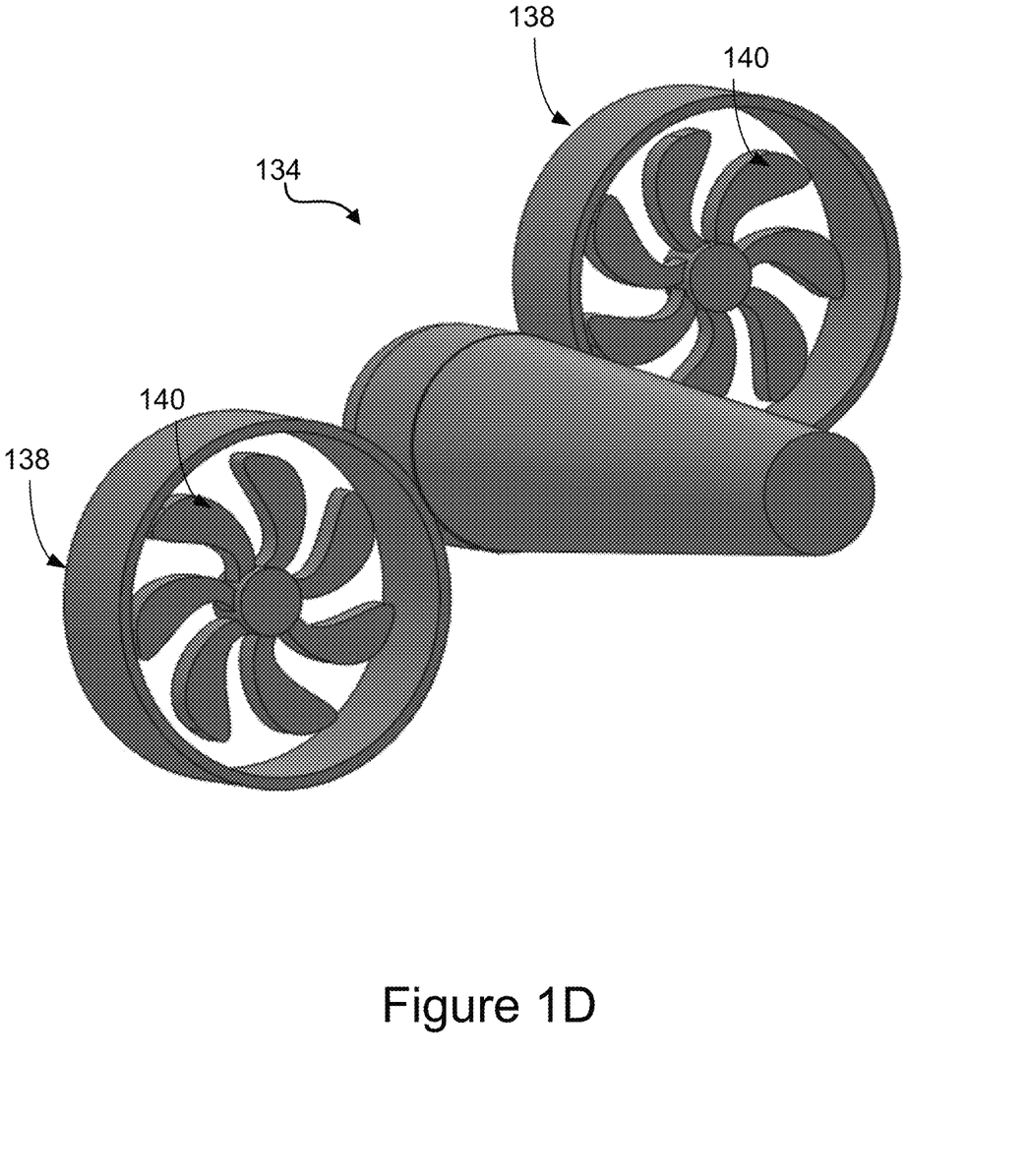
FIG. 1D shows an illustrative airflow actuator for providing haptic effects with airflow and thermal stimulation.

An example embodiment of an airflow actuator 134 is shown in FIG. 1D. The airflow actuator 134 further comprises two pneumatic pressure generating devices 138. In some embodiments, the pneumatic pressure generating devices 138 may comprise one or more impeller motors. In such an embodiment, an impeller motor comprises an electric motor configured to rotate a multi-blade fan or impeller 140. When the impeller motors are activated, they rotate the fans 140 to generate an airflow.

In other embodiments, the thermal conductivity or heat flux of different materials could be conveyed by overlaying thermal actuators 132, e.g., heating and cooling transducers, Peltier devices, etc. For example, a Peltier device operates by transferring heat from one side of the device to the other to output a steady temperature or a change in temperature. The temperature range output by the change in temperature of the Peltier device may mimic the heat flux property of a given material. FIG. 1C shows the haptic output device 118 incorporated into wearable device 136. Here, the haptic output device 118 only includes the thermal actuator 132, which comes into contact with the skin of the user so that the haptic output device 118 may output a heating or cooling effect directly to the user. In the embodiment shown in FIG. 1C, the thermal actuator 132 is coupled to a wearable device associated with the user's hand (e.g., a glove), but in other embodiments the thermal actuator 132 could be associated with a different wearable device (e.g., a watch, a sock, an arm or wrist-band, a hat, a shirt, pants, a wearable display (e.g., an AR/VR wearable device), or another wearable known in the art).

Furthermore, the processor 102 may operate the thermal actuator 132 by applying an electric signal, for example an AC signal, to the thermal actuator 132. As the electric current flows through the device, heat is transferred from one side of the device to the other to create a cool side and a hot side. The processor 102 may control the polarity of the electric signal to control which side of the device, the cool side or the hot side, the user feels.

In some embodiments, a high-voltage amplifier may generate the AC signal. Additionally, thermal kicking and/or thermal braking may be utilized to enhance the user experience by causing the thermal actuator 132 to change the temperature output faster. Thermal kicking occurs when an electric signal with a higher than necessary voltage is applied to the thermal actuator, which causes the thermal actuator to output the desired temperature within a shorter time period. The voltage of the electric signal is decreased to the necessary voltage to maintain the desired temperature after a given period of time, e.g., 1 millisecond, 1 centisecond, 1 decisecond, etc. Thermal braking occurs when an electric signal with a higher than necessary voltage and an opposite polarity is applied to the thermal actuator, which causes the thermal actuator to stabilize at the desired temperature output within a shorter time period.

Some embodiments may utilize multiple haptic output devices 118, or multiple thermal and airflow actuators 132, 134 in a single haptic output device 118, in concert to generate the desired haptic effect. For example, in some embodiments, haptic output device 118, as seen in FIG. 1B, may utilize a Peltier device to generate heat while, simultaneously, using a fan to blow the heated air towards the user.

Each of these configurations is illustrative and not the sole way in which such a system may be constructed. Further, in some embodiments, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA. In other embodiments, the haptic output device 118 may be used to output kinesthetic properties. For example, the force feedback properties could be overlaid with transducers that modify the stiffness of a material, e.g., using electroactive polymer tendons. Further, haptic output device 118 may be integrated into a proxy object or into the user's clothing or a wearable device.

Turning to memory 104, exemplary program components 124, 126, and 128 are depicted to illustrate how a device may be configured to determine and output haptic effects. In this example, a detection module 124 configures processor 102 to monitor sensor(s) 108 to determine environmental characteristics or characteristics of haptic output device 118 based on the airflow and thermal stimulation provided by haptic output device 118. For example, detection module 124 may sample sensor 108 in order to track, over time, one or more of the airflow, temperature, heat flux properties, and/or other characteristics of haptic output device 118 or the area of the user where the airflow and thermal stimulation is directed. In some embodiments, the detection module 124 configures processor 102 to monitor input devices to determine and then output haptic effects based on user input.

Haptic effect determination module 126 represents a program component that analyzes data regarding audio and video characteristics from the audio/visual output device(s) 122 as well as data from the detection module 124 to select a haptic effect to generate. Particularly, module 126 comprises code that determines, based on the characteristics of the haptic output device 118 and the VR/AR environment, one or multiple effects to generate and output by the haptic output device 118. Haptic effect determination module 126 may further comprise code that selects one or more existing haptic effects to output in response to detection of a change in characteristics of haptic output device 118 or a change of characteristics of various areas of the user, e.g., a change in temperature or airflow. Different haptic effects may be selected based on various combinations of these features.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, haptic effect generation module 128 may access a stored database of heat flux properties of materials to send to the haptic output device 118. Additionally, haptic effect generation module 128 may access a stored database of virtual environmental conditions that can be expressed as temperature and airflow to send to the haptic output device 118.

Other program components may be implemented into the system 100 to enable additional control of the system. In some embodiments, there may be a program component that permits users to design specific thermal and airflow effects that may be output by the haptic output device. For example, this component may be a time-domain editor that allows the user to define time durations in terms of effects that will be output within that time duration. In some embodiments, a program component permits users to target thermal and/or airflow effects to particular regions of the user's body. In some embodiments, there may be a program component that contains a perceptual model of human sensations of temperature and airflow, which permits users to design temperature and/or airflow effects according to how the sensations of temperature and airflow would feel to a user (e.g., accounting for wind chill) instead of raw temperature and airflow values. This design system may also enable synchronization to other modalities, such as video or audio. In other embodiments, there may be a program component that determines effects to be distributed securely via the cloud or another communication channel in order to synchronize the effects to other modalities on the internet or in computer, phone, or tablet apps. In still other embodiments, the program component includes a software developer's kit that permits a game or software developer to integrate effects directly into the coding of the game or software. This may include an abstraction layer that defines effects as relative intensities for both thermal and airflow actuators.

System 100 may further implement closed-loop control of haptic effects. For example, in one embodiment, processor 102 may output a haptic signal corresponding to a desired haptic effect to the haptic output device 118. The processor 102 may also receive a reference signal. The reference signal may represent a sensor signal that would be generated if a haptic output device accurately created a haptic effect. At the same time the processor 102 may receive a sensor signal from sensor 108 corresponding to the haptic effect that is currently output. The processor 102 may determine an error between the reference signal and the signal received from sensor 108. Based on the error, the processor 102 can determine how to modify the haptic signal to achieve an effect that is more representative of the reference signal. For instance, the processor 102 may increase the gain or other parameters of the haptic signal to create a stronger effect (e.g., apply more or less power to the thermal actuator 132 or the airflow actuator 134). Alternatively, the processor 102 might utilize a different type of controller, such as a proportional or proportional integral controller to modify the haptic signal. Further the processor 102 may implement a combination of varying the gain and type of controller used to modify the haptic signal. In still other embodiments, the processor 102 may control the vent 136 to direct airflow in a particular desired direction.

Figure 2A:
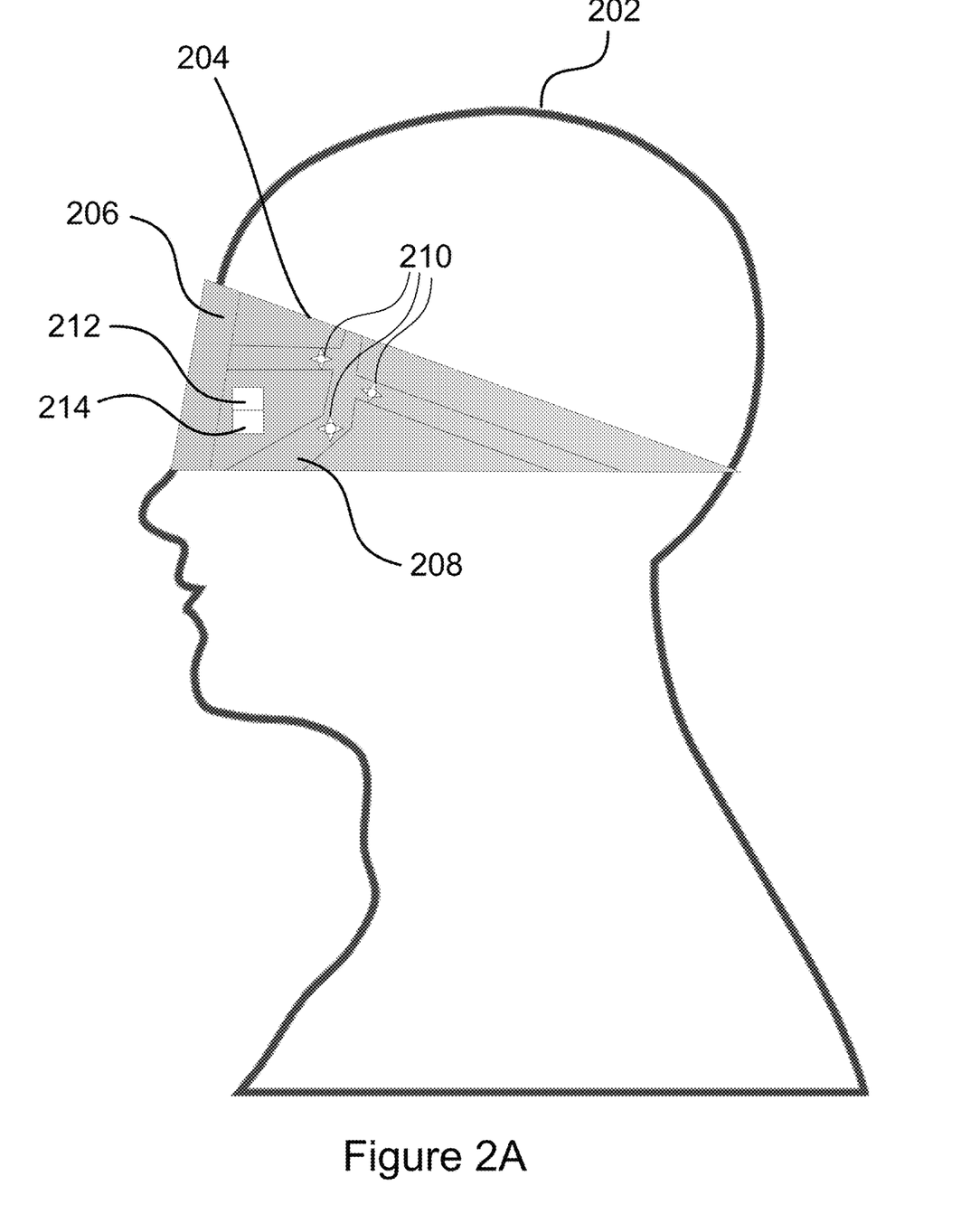
FIG. 2A shows another illustrative system for providing haptic effects with airflow and thermal stimulation.

Illustrative Embodiments for Providing Haptic
Effects with Airflow and Thermal Stimulation FIG. 2A shows another illustrative system for providing haptic effects with airflow and thermal stimulation. In the embodiment shown in FIG. 2A, a user 202 is wearing a wearable VR device 204. Though this embodiment shows the VR device 204 as a HMD, any type of VR or AR display system may be used. The VR device 204 includes a haptic output device 118 and a visual display 206, as well as headphones or speakers. In further embodiments, the VR device 204 may include gloves, armbands, jackets, pants, or any other suitable wearable device. These wearable devices may incorporate part or all of the system illustrated in FIG. 1A for determining, generating, and outputting haptic effects. The system illustrated in FIG. 1A may also be incorporated into any sort of electronic peripheral, such as a gaming controller, joystick, computer mouse, keyboard, etc. that may be used with the illustrative system of FIG. 2.

The VR device 204 may include haptic output devices that include an airflow actuator 212, such as a fan, blower, or impeller, capable of regulating or modulating airflow sensations directed towards the user 202 and a thermal actuator 214, such as a Peltier device. These actuators may be capable of regulating or modulating the temperature of a portion of the skin of the user 202, the perceived temperature of the air around the user 202, and/or the airflow sensations directed towards the user 202. The portion of the skin of the user 202 around and below the user's eyes is dense with afferent nerve endings making this area sensitive to changes in airflow and/or temperature. Thus, in some embodiments, the thermal actuator 214 may be configured to apply airflow and/or temperature changes to this area. In some embodiments, the thermal actuator 214 may come into contact with a portion of the skin of the user 202, e.g., the area around the eyes, forehead, scalp, temple, cheek, neck, or any other suitable area of the user 202. In other embodiments, the thermal actuator 214 may be positioned at a distance from the skin of the user 202.

Figure 2B:
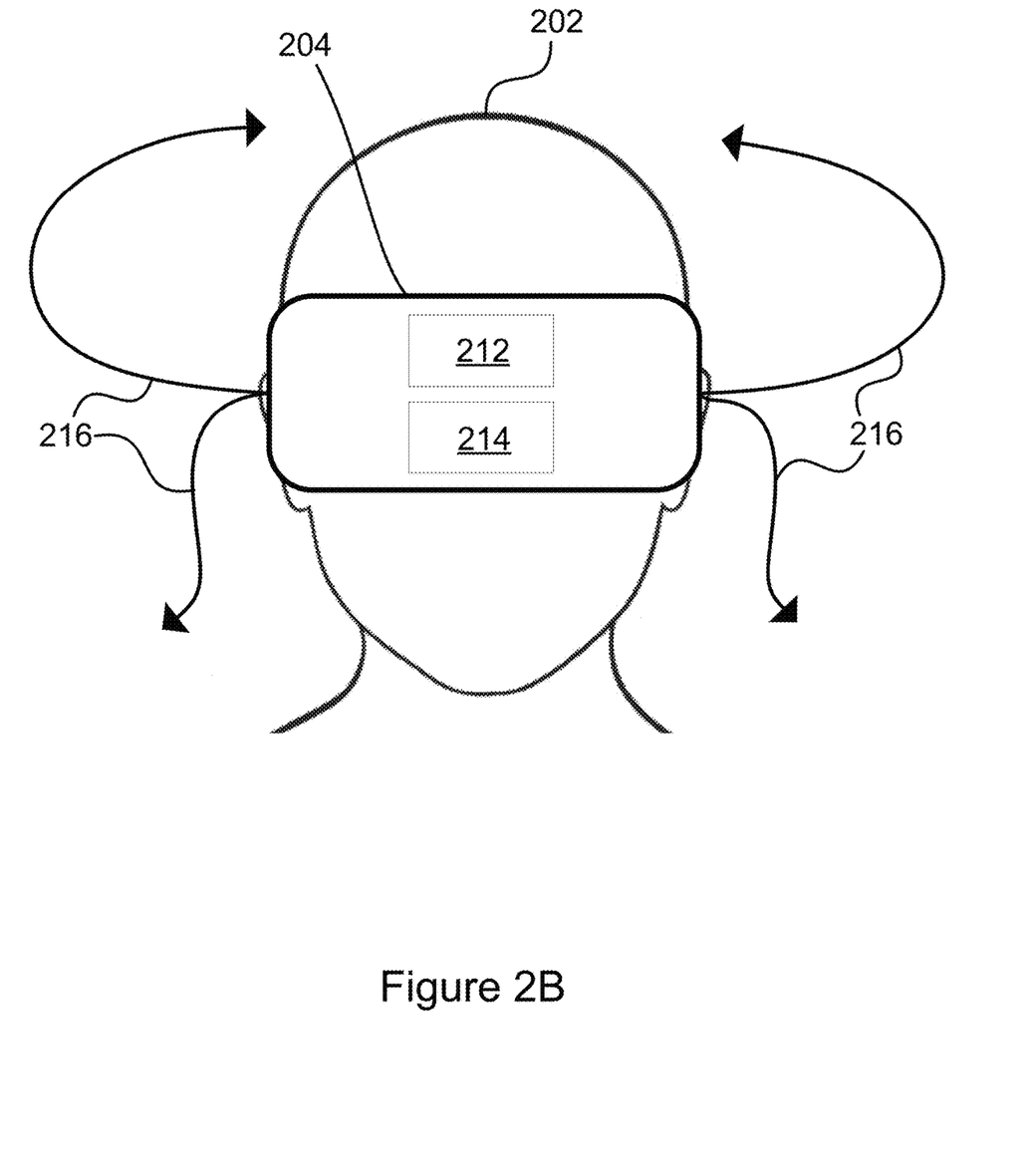
FIG. 2B shows another illustrative system for providing haptic effects with airflow and thermal stimulation.

Combining the airflow actuator 212 and the thermal actuator 214 with the VR device 204 allows for more immersive effects, like the illusion of dynamic meteorological environments, to be created in a VR or AR environment. Additionally, combining these devices into a HMD VR device 204 enables the user 202 or a VR chaperone to easily put on or take off the VR device 204 without any additional steps, which may allow for the quick throughput of users at a LBE. FIG. 2B shows another view of the illustrative system for providing haptic effects with airflow and thermal stimulation as shown in FIG. 2. Here, various airflows, represented by arrows 216, are output to the user by the airflow actuator 212. The thermal actuator 214 may be used to adjust the temperature of the various airflows 216. For example, each airflow 216 may be a hot airflow or a cold airflow.

In some embodiments, the thermal actuator 214 is positioned so as to not touch the skin of the user 202. Instead, the thermal output from the thermal actuator 214 is "coupled" to the airflow generated by the airflow actuator 212, which results in the temperature of the airflow that is directed at the user 202 taking on an intended temperature (e.g., a higher or lower than ambient temperature) based on the thermal output of the thermal actuator 214.

In other embodiments, the thermal actuator 214 is positioned so as to be in direct contact with the skin of the user 202 so that the temperature of the skin can be changed directly by the thermal device. Here, the skin in direct contact with the thermal device may or may not be the same portion of skin that is stimulated by the airflow actuator 212. In still other embodiments, there may be multiple thermal actuators 214 where some are positioned so as to not touch the skin of the user 202 and only regulate the temperature of the airflow while others are positioned directly on the skin of the user 202 in order to regulate the temperature of skin of the user 202 directly.

In some embodiments, the VR device 204 may include any suitable number of airflow channels 208 and diverter vent valves 210 in order to direct the airflow and thermal stimulation to different areas of the skin of the user 202. The processor 102 described above with respect to FIG. 1A, or a separate processor, may be used to control the opening and closing of the diverter vent valves 210 in order to distribute the airflow through the airflow channels 208 to different areas of the skin of the user 202.

The processor 102 determines the haptic effect that that is output by the haptic output device 118. The processor 102 may determine the haptic effect based on a display signal from the visual display 206 that outputs a visual effect. In some embodiments, the processor 102 may access a database of virtual environmental conditions expressed as temperature and airflow in order to determine the haptic effect that best corresponds to or mimics the conditions the user perceives on the visual display 206. In some embodiments, a sensor 108 may transmit a sensor signal to the processor 102, which determines the haptic effect based in part on the sensor signal.

In some embodiments, the haptic effects output by the airflow actuator 212 and the thermal actuator 214 may be based in part on a heat flux property of an item or material displayed to the user 202 via the display 206. Heat flux is the rate of heat energy transfer through a given surface. Different materials have different heat flux properties, which causes the different materials to feel like they are different temperatures to the human touch. For example, the heat flux exchanged during physical contact of aluminum with human skin is higher than the heat flux exchanged during physical contact of rubber with human skin. And the heat flux exchanged during physical contact of rubber with human skin is higher than the heat flux exchanged during physical contact of wood with human skin. Therefore, the temperature sensation the person feels over time while in physical contact with the materials changes at a different rate for each material. In one example embodiment, a piece of aluminum may generate a temperature sensation such that a person who touches the piece of aluminum that starts at 24° C. before contact may feel the temperature of the aluminum change to approximately 23° C. after approximately 10 seconds, to approximately 22.5° C. after approximately 20 seconds, and to approximately 22° C. after approximately 40 seconds. In another example embodiment, a piece of wood may generate a temperature sensation such that a person who touches a piece of wood that starts at 24° C. before contact may feel the temperature of the wood change to approximately 28.2° C. after approximately 10 seconds, to approximately 28.6° C. after 20 seconds, and to approximately 28.8° C. after approximately 40 seconds.

In some embodiments, the processor 102 may access a database of heat flux properties and determine the heat flux property based in part on the display signal or on predefined parameters. For example, if a user is interacting with a virtual object made of aluminum, the processor 102 may access the database of heat flux properties to determine the heat flux property of aluminum. The processor 102 may then determine a haptic effect based on the determined heat flux property of aluminum, where the haptic effect causes a change in temperature to the thermal actuator similar to the change in temperature of aluminum when in contact with human skin. The virtual object may be made out of any material of which the heat flux property is known and included in the database of heat flux properties, e.g., marble, Plexiglas, graphite, rubber, wood, steel, etc. The processor 102 will determine a heat flux property associated with that material and output a voltage to the thermal actuator to output a temperature change effect to simulate the feel of the material.

In outputting the determined haptic effect, the voltage applied to the thermal actuator may match the profile of the determined heat flux property so that the temperature output by the thermal actuator changes over time to closely mimic the temperature evolution for the material based on the determined heat flux property of the material. In one example embodiment, the voltage applied to the thermal actuator may cause the temperature output by the thermal actuator to decrease over time if the material to be simulated by the determined haptic effect is a material with a relatively high heat flux property such as conductive metals like aluminum or steel. In another example embodiment, the voltage applied to the thermal actuator may cause the temperature output by the thermal actuator to increase over time if the material has a relatively lower heat flux property such as an insulating material like wood, Plexiglass, or rubber.

Figure 3:
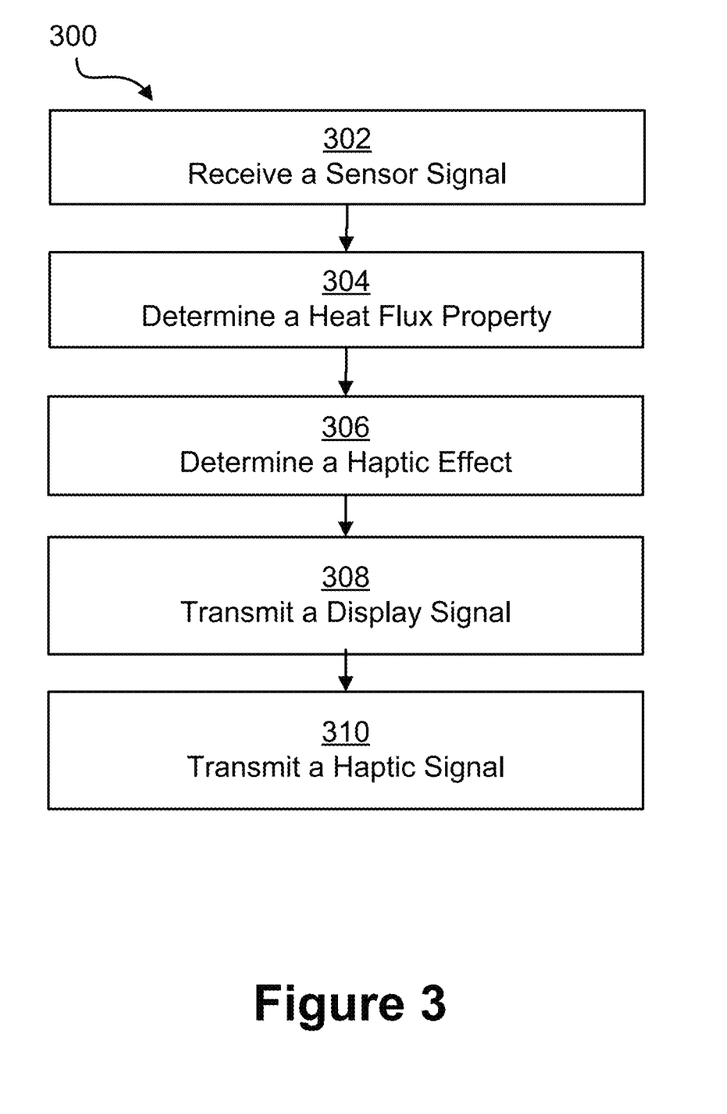
FIG. 3 is a flow chart of method steps for one example embodiment for providing haptic effects with airflow and thermal stimulation.

Illustrative Methods for Providing Haptic Effects with Airflow and Thermal Stimulation FIG. 3 is a flow chart of method steps for one example embodiment for providing haptic effects with airflow and thermal stimulation. In some embodiments, the steps may be implemented in program code that is executed by a processor, for example, the processor in a general purpose computer, a mobile device, VR or AR control system, or a server. In some embodiments, these steps may be implemented by a group of processors. In some embodiments one or more steps may be omitted or performed in a different order. Similarly, in some embodiments, additional steps not shown may also be performed. The steps below are described with reference to components described above with regard to computing device 101 shown in FIGS. 1A, 1B, 1C, and 1D and/or the system shown in FIGS. 2A and 2B.

In the embodiment shown, a process 300 begins at step 302 when a processor, such as processor 102, receives a sensor signal. The processor 102 receives sensor signals from one or more sensors 108. Using the sensor signals, the processor 102 analyzes the environment around a user and/or around a haptic output device 118. For example, the sensor signals may indicate the temperature or airflow at the surface of the skin of the user.

At step 304 the processor 102 next determines a heat flux property based in part on a display signal or a predefined parameter. In some embodiments, processor 102 determines the heat flux property by accessing a database of heat flux properties. For example, processor 102 may receive a display signal that indicates the user is in contact with an object made of steel. Based on this display signal, the processor 102 will access the database of heat flux properties to determine the heat flux property of steel. The database may have any known heat flux property such as aluminum, marble, Plexiglas, graphite, rubber, wood, etc. As discussed above, the heat flux property of a material determines the rate of change of temperature that a person perceives when physically touching the material.

At step 306 the processor 102 next determines a haptic effect. In some embodiments, the processor 102 may determine the haptic effect based on the sensor signal from step 302 and/or the determined heat flux property at step 304. For example, where the heat flux property is determined to be the heat flux property of steel, a haptic effect that renders the illusion of steel is determined. This illusion is generated by changing the temperature output by the thermal actuator 132 over time so that the temperature output matches or is similar to the temperature evolution over time when a person's skin is in physical contact with actual steel. For example, the temperature output may start at 24° C., then may change to approximately 23.9° C. after approximately 30 seconds, then change to approximately 23.8° C. after approximately 40 seconds.

The sensor signal may be used to determine if the haptic effect needs to be adjusted in order to more accurately render the illusion of steel or if the haptic effect needs to be adjusted or stopped altogether to prevent harm from occurring to the user. In other examples, the processor may determine the haptic effect based on a display signal received from the audio/visual output device 122. In determining the haptic effect, the processor 102 may also determine whether the thermal actuator 132 and/or the airflow actuator 134 will be used to output the haptic effect. The thermal actuator 132 may be used independently to adjust the temperature output by the haptic output device 118 and the airflow actuator 134 may be used independently to adjust the airflow output by the haptic output device 118. In some examples, the thermal actuator 132 and the airflow actuator 134 may be used together to adjust the temperature of the airflow output by the haptic output device 118.

At step 308 the processor 102 transmits a display signal to the display. This causes a visual output to be displayed on the display, e.g., a VR HMD or an AR HMD. In some embodiments, the processor 102 may determine the haptic effect based in part on the display signal. For example, the processor 102 may determine that a cold airflow should be produced by the thermal actuator 132 and the airflow actuator 134 when a snowy mountain is displayed on the display.

At step 310 the processor 102 transmits a haptic signal associated with the haptic effect to the haptic output device 118 so the haptic output device 118 may output the haptic effect. For example, the haptic output device(s) in the VR device 204 may output a haptic effect that simulates the heat flux property of steel. In some embodiments, the VR device 204, or any other wearable device, may comprise one or more haptic output devices 118 capable of outputting the haptic effect.

The haptic output device 118 may use the thermal actuator 132, the airflow actuator 134, or both actuators independently or simultaneously to output the determined haptic effect. For example, the thermal actuator 132 may be used individually to simulate the heat flux property of steel by changing the temperature output by the thermal actuator 132 over time to match the range of temperatures a human perceives when touching an actual piece of steel. The airflow actuator 134 may be used simultaneously with the thermal actuator 132 to regulate airflow sensations, and the temperature of those airflow sensations, directed towards the user so that a more immersive experience is generated based on what the user is seeing on the VR device 204.

The embodiments described herein provide a more immersive, better optimized user experience by combining thermal and airflow actuators to recreate real-world haptic effects based on virtual environments. Integrating these actuators with HMDs and other wearable peripheral devices enable more compelling haptics and easier transitions between users of the HMDs and other wearable peripheral devices at an LBE. Additionally, basing the haptic effects on the heat flux properties of materials results in a more accurate representation of those materials because a human's sense of touch takes into account the rate of change of temperature of the material.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a haptic output device comprising a thermal actuator; and
   a processor communicatively coupled to the haptic output device and configured to:
   receive a sensor signal from at least one sensor;
   determine a heat flux property based in part on a display signal;
   determine a haptic effect based in part on the heat flux property and the sensor signal, the heat flux property being representative of a rate of change of temperature; and
   transmit a haptic signal associated with the haptic effect to the haptic output device.

2. The system of claim 1, wherein the processor is configured to access a database of heat flux properties to determine the heat flux property.

3. The system of claim 1, wherein the haptic output device is mechanically coupled to a wearable device.

4. The system of claim 3, wherein a display is mechanically coupled to the wearable device and the wearable device comprises at least one of a virtual reality head-mounted display or an augmented reality head-mounted display.

5. The system of claim 1, wherein the thermal actuator comprises a Peltier device.

6. The system of claim 1, wherein the thermal actuator is configured to come into contact with a user.

7. The system of claim 1, wherein the at least one sensor comprises at least one of a thermocouple, a temperature sensor, a heat flux sensor, or an airflow sensor.

8. The system of claim 1, wherein the haptic output device further comprises an airflow actuator.

9. The system of claim 8, wherein the haptic effect simulates the heat flux property by either adding or subtracting heat from an airflow generated by the airflow actuator.

10. The system of claim 1, wherein the processor is further configured to receive an input signal from an input capture device and determine the haptic effect based in part on data received from the input capture device.

11. A method comprising:
receiving a sensor signal from at least one sensor;
determining a heat flux property based in part on a display signal;
determining a haptic effect based in part on the heat flux property and the sensor signal, the heat flux property being representative of a rate of change of temperature; and
transmitting a haptic signal associated with the haptic effect to a haptic output device that comprises a thermal actuator.

12. The method of claim 11, wherein determining the heat flux property based in part on the display signal comprises accessing a database of heat flux properties.

13. The method of claim 11, wherein the haptic output device is mechanically coupled to a wearable device.

14. The method of claim 13, wherein a display is mechanically coupled to the wearable device and the wearable device comprises at least one of a virtual reality head-mounted display or an augmented reality head-mounted display.

15. The method of claim 11, wherein the thermal actuator comprises a Peltier device.

16. The method of claim 11, wherein the thermal actuator is configured to come into contact with a user.

17. The method of claim 11, wherein the at least one sensor comprises at least one of a thermocouple, a temperature sensor, a heat flux sensor, or an airflow sensor.

18. The method of claim 11, wherein the haptic output device further comprises an airflow actuator.

19. The method of claim 18, wherein the haptic effect simulates the heat flux property by either adding or subtracting heat from an airflow generated by the airflow actuator.

20. A non-transitory computer readable medium comprising program code, which when executed by a processor is configured to cause the processor to:
receive a sensor signal from at least one sensor;
determine a heat flux property based in part on a display signal;
determine a haptic effect based in part on the heat flux property and the sensor signal, the heat flux property being representative of a rate of change of temperature; and
transmit a haptic signal associated with the haptic effect to a haptic output device that comprises a thermal actuator.

* * * * *